(12) United States Patent  
Ziv-Av

(10) Patent No.: US 9,908,243 B2  
(45) Date of Patent: Mar. 6, 2018

(54) MECHANICAL ADJUSTABLE DEVICE

(71) Applicant: Ziv-Av Engineering Ltd., Be'erot Yitzhak (IL)

(72) Inventor: Amir Ziv-Av, Kiryat Ono (IL)

(73) Assignee: ZIV-AV ENGINEERING LTD., Be'erot Yitzhak (IL)

(*) Notice: Subject to any disclaimer, the term of this patent is extended or adjusted under 35 U.S.C. 154(b) by 0 days.

(21) Appl. No.: 15/093,039

(22) Filed: Apr. 7, 2016

(65) Prior Publication Data

US 2017/0291312 A1    Oct. 12, 2017

(51) Int. Cl.
*B25J 18/06* (2006.01)
*B25J 9/14* (2006.01)

(52) U.S. Cl.
CPC ............. *B25J 18/06* (2013.01); *B25J 9/142* (2013.01)

(58) Field of Classification Search
CPC . A61B 1/0055; A61B 34/30; A61B 2034/306; B25J 9/06; B25J 9/065; B25J 9/142; B25J 18/06; Y10S 901/21; Y10T 74/20323
USPC ............ 74/490.01, 490.04, 490.05; 600/141; 901/14, 21, 28
See application file for complete search history.

(56) References Cited

U.S. PATENT DOCUMENTS

| | | | | |
|---|---|---|---|---|
| 3,266,059 A * | 8/1966 | Stelle | ......................... | B25J 9/06 138/120 |
| 4,149,391 A * | 4/1979 | Driver | ..................... | E21B 17/20 138/120 |
| 4,393,728 A * | 7/1983 | Larson | .................. | B05B 15/061 248/160 |
| 4,551,061 A | 11/1985 | Olenick | | |
| 4,661,039 A * | 4/1987 | Brenholt | .................. | B25J 9/142 414/735 |
| 4,777,868 A * | 10/1988 | Larsson | ................ | F15B 15/103 92/42 |
| 4,784,042 A * | 11/1988 | Paynter | .................... | B25J 9/142 414/7 |
| 4,790,624 A * | 12/1988 | Van Hoye | ............ | A61B 1/0058 385/118 |
| 5,080,000 A * | 1/1992 | Bubic | ...................... | B25J 18/06 294/119.3 |
| 5,083,498 A * | 1/1992 | Sato | ...................... | F15B 15/125 73/731 |
| 5,203,380 A * | 4/1993 | Chikama | .............. | A61B 1/0055 138/118 |
| 5,251,538 A * | 10/1993 | Smith | ........................ | F16J 3/06 92/34 |

(Continued)

FOREIGN PATENT DOCUMENTS

SU           837845 A1 *  6/1981  ............. B25J 9/142

*Primary Examiner* — Victor L MacArthur
(74) *Attorney, Agent, or Firm* — Browdy and Neimark, PLLC

(57) ABSTRACT

A mechanical adjustable device described herein is adapted to enable changing the spatial shape of the device from a first shape to a second shape, while retaining the device in its second shape. Preferably, the device includes: a) a spring; b) a plurality of longitudinally extended ribs or wires that are capable of being bent, wherein these plurality of ribs or wires are circumferentially disposed along an enclosure confined by the spring, adjacent to the inner side of the spring; and c) a flexible sleeve or tube disposed longitudinally along the enclosure confined by the spring.

7 Claims, 2 Drawing Sheets

(56) References Cited

U.S. PATENT DOCUMENTS

| | | | | |
|---|---|---|---|---|
| 5,317,952 A | * | 6/1994 | Immega | B25J 9/104 |
| | | | | 74/490.04 |
| 6,178,872 B1 | * | 1/2001 | Schulz | B25J 9/142 |
| | | | | 92/92 |
| 6,772,673 B2 | * | 8/2004 | Seto | B25J 9/142 |
| | | | | 92/92 |
| 8,663,096 B2 | * | 3/2014 | Viola | A61B 1/0055 |
| | | | | 128/898 |
| 2013/0091974 A1 | * | 4/2013 | Riwan | B25J 18/06 |
| | | | | 74/490.04 |

* cited by examiner

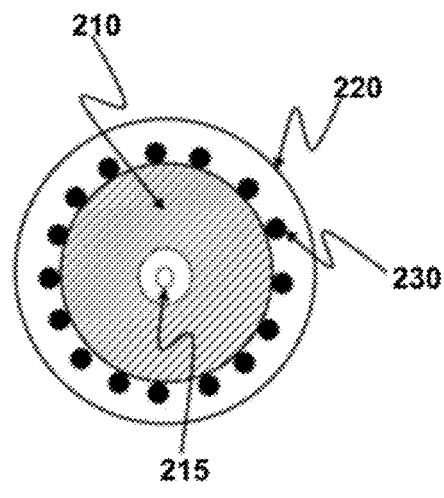
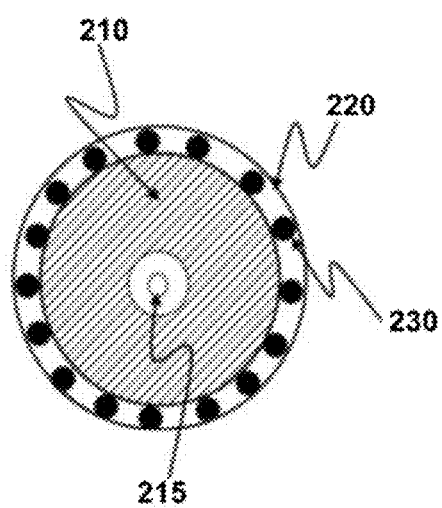
FIG. 2A                FIG. 2B
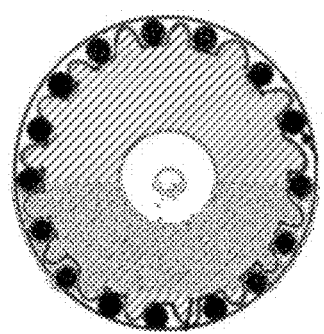
FIG. 3

MECHANICAL ADJUSTABLE DEVICE

TECHNICAL FIELD

The present disclosure generally relates to mechanical engineering, and more particularly to mechanical arms that are configured to enable adjusting their spatial position and maintaining that adjusted position.

BACKGROUND

A mechanical arm has typically similar functions to a human arm. The arm may be the whole mechanism or may be part of a more complex robot. There are a various mechanical arms which may be used by twisting their spatial position which are adapted to maintain their last position.

U.S. Pat. No. 4,551,061 describes a robot arm formed of a bundle of adjacent elastomeric tubes supplied independently with fluid pressure to force bending, extension or contraction. The tubes are maintained in parallel alignment by means of spaced apart parallel ribs through which the tubes pass. Parallel, spaced apart, rods extending through the ribs, but fixed at one end, have opposite free ends passing into position sensors. Bending and lengthwise changes in arm position may be sensed by the rods and used to control pressure in individual arms to correct or change arm position. In other words, the solution provided by this publication teaches applying fluid pressure enables the robot arm to bend at a certain curvature radius by applying a fluid pressure via the elastomeric tubes, and by the use of this pressure, to obtain the required bending, extraction or contraction.

However, one of the major problems associated with mechanical arms as known in the art lies with the fact that it is not easy, if not impossible, to have a mechanical arm flexible enough so that it would be bent to a desired shape and once the desired shape is reached, turning the mechanical arm into a rigid structure, thereby ensuring that it retains its bent desired shape for any required period of time.

Some other solutions are known in the art that provide an arm which may be bent to a desired shape and once the desired shape is reached, retain the desired shape. For example, a flexible/adjustable, hollow support arm of a reading lamp, a balanced-arm lamp which is a lamp that can be moved into any position, and the springs comprised therein will maintain its position until moved again, flexible cooling water conduits for CNC machines, etc. These flexible arms are made of a plurality of joints that are interlocked in a twisted position due the friction developed therebetween while changing the arms' shape (i.e. when the arm is twisted).

The present invention seeks to provide a novel device, which may be used as and/or be incorporated in a mechanical arm, while overcoming drawbacks of prior art solutions.

SUMMARY OF THE DISCLOSURE

The disclosure may be summarized by referring to the appended claims.

It is an object of the present invention to provide a mechanical arm that has a mode in which it can be bent to receive different shapes as desired, and another mode where it remains at the desired shape as a substantially rigid element.

Other objects of the invention will become apparent as the description of the invention proceeds.

In an embodiment, a mechanical adjustable device is provided. The device is characterized in that in it is adapted to enable changing its spatial shape from a first spatial shape to a second spatial shape, and retaining the mechanical adjustable device in its second shape.

According to another embodiment, the mechanical adjustable device is further adapted to enable changing the second spatial shape into any other third spatial shape.

By yet another embodiment, the mechanical adjustable device comprises:
(i) a spring;
(ii) a plurality of longitudinally extended ribs/wires characterized in that they are capable of being bent, wherein said plurality of longitudinally extended ribs/wires are circumferentially disposed along an enclosure confined by the spring, adjacent to the inner side of the spring; and
(iii) a flexible sleeve/tube disposed longitudinally along the enclosure confined by the spring.

The extended ribs/wires are preferably made of steel (e.g. 2-3 mm thick steel wires). As will be appreciated by those skilled in the art, the term "ribs" should be understood to encompass ribs having any type of a cross section, whether regular or not. Also, it should be understood that not all of the ribs comprised in the mechanical arm must have the same cross section as the others.

According to still another embodiment, the mechanical adjustable device is adapted to enable changing its spatial shape from the first spatial shape to the second spatial shape by applying external force thereto, while the retaining of the second shape is achieved by increasing the pressure within the flexible sleeve/tube, thereby expanding the envelope of the flexible sleeve/tube, tightening the ribs/wires to the inner side of the spring, and consequently, locking the mechanical adjustable device at its second spatial shape.

According to another embodiment, the second spatial shape is changeable into any other third spatial shape, by releasing the pressure within the flexible sleeve/tube (e.g. to atmospheric pressure), applying an external force onto the mechanical adjustable device to bring it to the desired third spatial shape and re-increasing the pressure within the flexible sleeve/tube thereby locking the mechanical adjustable device in its third spatial shape.

By yet another embodiment, the spring is characterized in having a varying cross-section.

In accordance with another embodiment, the spring is characterized in having a bellow configuration.

According to still another embodiment, the mechanical adjustable device comprises at least three longitudinally extending ribs/wires.

By still another embodiment, the sleeve/tube is made of an elastomeric material.

As will be appreciated by those skilled in the art, the term "mechanical adjustable device" should not be considered to be limited to any certain shape but rather may be in any applicable form and/or shape (e.g. in a form of a cylinder, a wheel, a square and the like).

According to another embodiment, the mechanical adjustable device further comprising means to retain the ribs/wires at their circumferential location relative to each other during both the non-expanded and the expanded modes, e.g. by having longitudinal grooves or ducts along the flexible tube/sleeve.

In accordance with still another embodiment, the mechanical adjustable device further comprises an inlet means (e.g. a valve) operative to allow introduction of fluid into an inflatable flexible tube/sleeve. The inlet assembly is preferably connected in fluid communication to the inflatable tube. The inlet assembly may have a rigid collar which is adapted to be mounted at an opening of the inflatable tube to enable receiving an exit end of a filling nozzle that belongs to an inflating system which supplies pressurized gas for inflating the inflatable flexible tube/sleeve. Preferably, the fluid is a member of the group containing: air, oil and water.

By yet another embodiment, the tube of the mechanical adjustable device comprises a plurality of sections and wherein the mechanical adjustable device is adapted to enable outwardly expansion of one or more but less than all, of the plurality of sections, thereby enabling partial expansion of the flexible tube/sleeve.

According to another aspect there is provided a robotic arm comprising the mechanical arm described hereinabove.

BRIEF DESCRIPTION OF THE DRAWINGS

For a more complete understanding of the present invention, reference is now made to the following detailed description taken in conjunction with the accompanying drawings wherein:

FIGS. 1A and 1B illustrate a schematic overview of an example of a device according to the present invention, wherein:

FIG. 1A illustrates the exemplified device at its non-inflatable mode;

FIG. 1B illustrates the exemplified device after bending and pressurizing it;

FIGS. 2A and 2B illustrate cross section views of the device exemplified in FIGS. 1A and 1B, wherein:

FIG. 2A illustrates the cross section view of the exemplified device at its non-inflatable mode;

FIG. 2B illustrates the cross section view of the exemplified device after bending and pressurizing it; and FIG. 3—demonstrates a cross section view of another exemplified device after bending and pressurizing it.

DETAILED DESCRIPTION

Figures 1A, 1B:
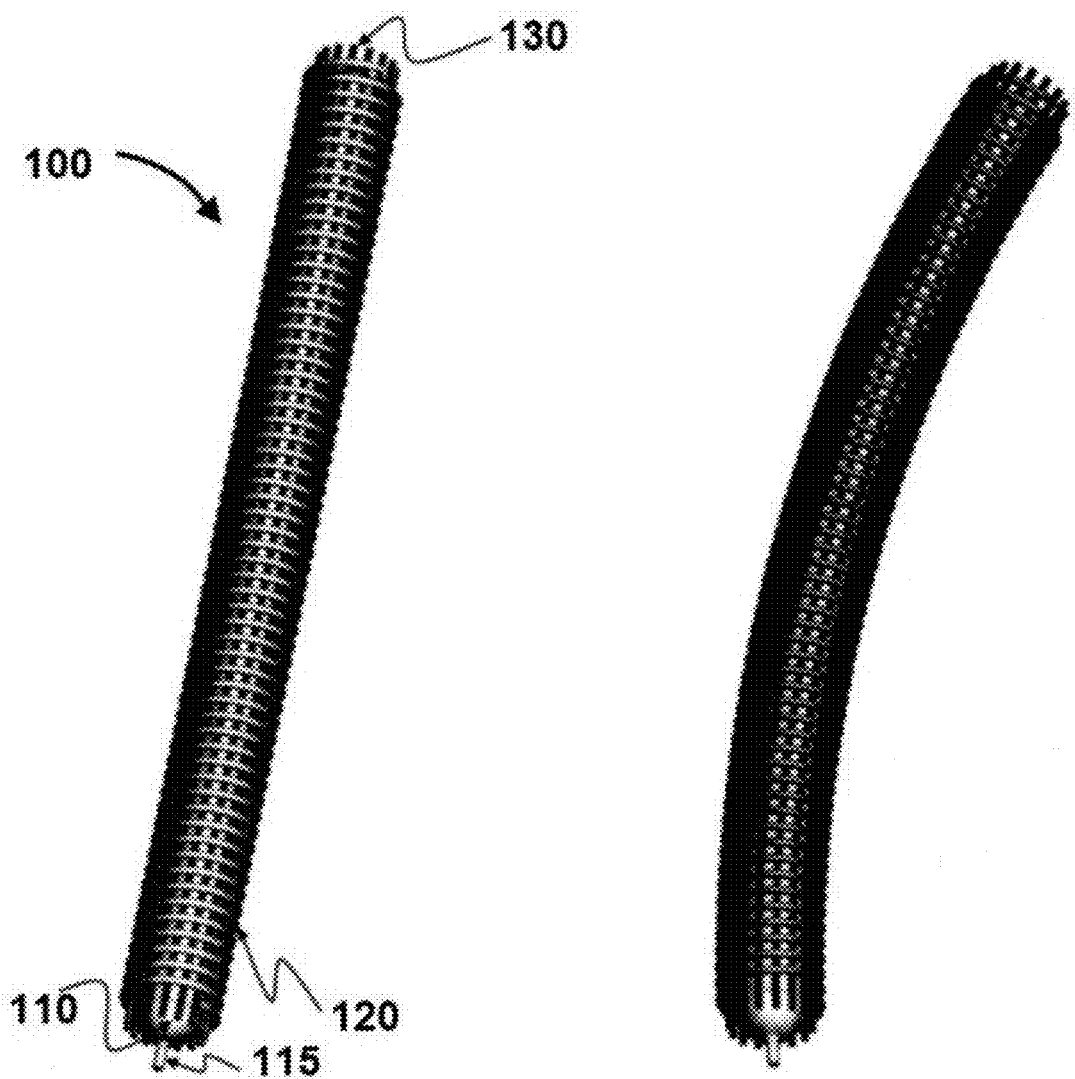

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

FIG. 1A illustrates an example of a 1 meter long device 100 (e.g. a cooling water conduit in a CNC machine) comprising an inflatable tube 110, around which a spiral spring 120 is winded. Spring 120 has a winding diameter of 100 mm and a thickness of 5 mm, and a plurality of longitudinal, 2-3 mm thick metal ribs 130, disposed in the annulus confinement created by the outer surface of inflatable tube 110 and spring 120. The device may further comprise a longitudinal flexible sleeve located between the ribs and the spring, and preferably, this sleeve increases the friction otherwise existing between the ribs and the inner spring surface. In addition, valve 115 is connected to the inflatable tube 110, to enable having it inflated, by allowing the introduction of air (in a pneumatic device) or oil (in an hydraulic device) for example to the inflatable tube. Once the non-inflated device is brought (e.g. by bending it) to the desired shape, the pressure building fluid is introduced via valve 125. FIG. 1A illustrates the device in its non-inflated (i.e. non-expanded) position, whereas FIG. 1B illustrates the same device 100 after it was bent to the desired shape and pressurized (i.e. in its expanded position).

FIGS. 2A and 2B present cross sections of the device at both modes illustrated in FIGS. 1A and 1B, respectively. In these Figs. 210 is the inflatable tube, 220 is the spiral spring winded around it, 230 are the ribs, and valve 215 is connected to the inflatable tube 210. As may be seen from these two Figs, after bending the device to its final desired shape and upon introducing the pressure building fluid, the cross section of the inflatable tube expands, thereby pushing the ribs outwardly towards the winding spring. Once the inflatable tube reaches its maximal diameter as dictated by the dimension of the winded spring and its elasticity constant, the inner pressure built inside the inflatable tube due to the introduction of the fluid thereat, increases substantially the friction between the ribs and the winded spring, thereby locking the ribs and the spring at their positions due the developing shear forces, and consequently ensuring that the device is retained at its final position.

In other words, the embodiment described herein provides a solution that allows fixating a "snake"-like arm at a certain position. This position is determined by using external means, e.g. manually twisting/bending/distorting the arm to a desired spatial position (i.e. a three-dimensional twisting/bending/distorting). In order to obtain that, after the mechanical arm, which comprises a structure that includes an external spring and thin elastic rods located longitudinally adjacent to the spring inner side, and an inflatable flexible sleeve, located longitudinally within the structure (i.e. within the spring), is twisted/bent to a desired spatial position, thereby causing the spring and the rods to twist/bend accordingly, and to reach a final non-expandable mode of the arm. Once the final non-expandable mode of the arm is obtained, a fluid (e.g. air or hydraulic fluid) is inserted into the inflatable flexible sleeve, causing the sleeve to expand, an action which leads to locking (fixating) the arm in the desired spatial position. This desired spatial position, which was determined prior to inserting the inflating fluid, is essentially the final non-expandable mode of the arm, and its locking is achieved by the rods that have been pressured (pushed) against the spring, while both the spring and rods are in their desired (i.e. non-expandable mode) spatial position.

FIG. 3 illustrates another embodiment wherein the inflatable tube has a non-circular cross section.

It should be understood that features described with respect to one embodiment may be used with other embodiments and that not all embodiments of the invention have all of the features shown in a particular figure. Variations of embodiments described will occur to persons of the art.

The invention claimed is:

1. A mechanical adjustable device configured to change its spatial shape from a first spatial shape to a second spatial shape and retaining the mechanical adjustable device in its second spatial shape, and comprises:
   a spring;
   a plurality of longitudinally extended ribs or wires configured to be bent, wherein said plurality of longitudinally extended ribs or wires are circumferentially disposed along an enclosure confined by the spring, adjacent to an inner side of the spring; and
   a flexible sleeve or tube disposed longitudinally along the enclosure confined by the spring,
   and wherein said mechanical adjustable device changes its spatial shape from the first spatial shape to the second spatial shape in response to an applied external force, and retains the second spatial shape by increasing pressure within the flexible sleeve or tube, thereby expanding the envelope of the flexible sleeve or tube, tightening the ribs or wires to the inner side of the spring, and consequently locking the mechanical adjustable device in its second spatial shape.

2. The mechanical adjustable device of claim 1, wherein the second spatial shape is changeable into any other third spatial shape, by releasing the pressure within the flexible sleeve or tube, applying an external force onto the mechanical adjustable device to bring the mechanical adjustable device to the desired third spatial shape and re-increasing the pressure within the flexible sleeve or tube, thereby locking the mechanical adjustable device in its third spatial shape.

3. The mechanical adjustable device of claim 1, wherein the spring has a varying cross-section.

4. The mechanical adjustable device of claim 1, wherein the spring has a bellow configuration.

5. The mechanical adjustable device of claim 1, comprising at least three longitudinally extending ribs or wires.

6. The mechanical adjustable device of claim 1, wherein the sleeve or tube is made of an elastomeric material.

7. A robotic arm comprising the mechanical arm of claim 1.

* * * * *